(No Model.)
C. J. GUSTAVESON.
HOPPLE.
No. 267,877. Patented Nov. 21, 1882.
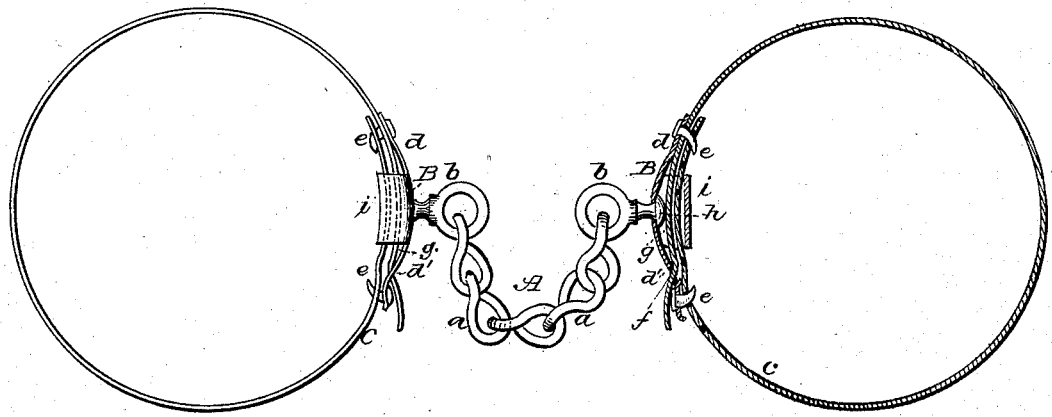
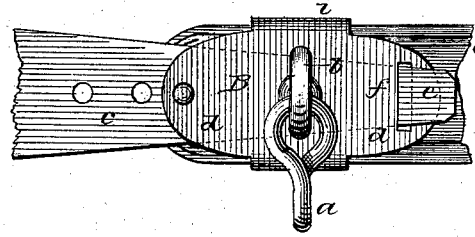
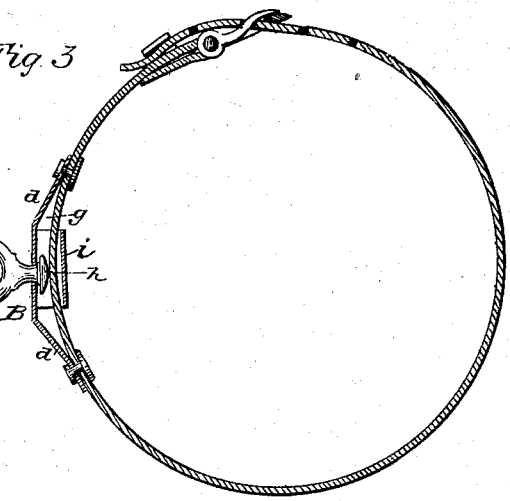
WITNESSES:
Fred G. Dieterich
A. G. Syme
INVENTOR:
C. J. Gustaveson
BY
ATTORNEYS.
N. PETERS, Photo-Lithographer, Washington, D. C.

UNITED STATES PATENT OFFICE.

CHARLES J. GUSTAVESON, OF SALT LAKE CITY, UTAH TERRITORY.

HOPPLE.

SPECIFICATION forming part of Letters Patent No. 267,877, dated November 21, 1882.

Application filed March 25, 1882. (No model.)

*To all whom it may concern:*

Be it known that I, CHARLES J. GUSTAVESON, of Salt Lake City, in the county of Salt Lake and Territory of Utah, have invented a new and useful Improvement in Hopples, of which the following is a full, clear, and exact description, reference being had to the annexed drawings, forming part of this specification.

The object of this invention is to provide an improved hopple for animals, whereby the ordinary end links for connecting the chain with the leg-bands shall be dispensed with, and greater ease and freedom of movement between the said parts shall be secured.

In the accompanying drawings, Figure 1 is a plan view of my improved hopple, showing one of the connecting-plates in section; Fig. 2 is a side elevation of one of the plates and leg-bands, the latter being partially broken away; and Fig. 3 is a sectional view of a plate, showing a different manner of connecting it to the leg-band.

In constructing the hopple I employ a chain, A, having twisted links $a$ and a swivel, $b$, at each end. The purpose of the twisted links is to prevent sticks or other objects from catching in the chain and interfering with the movements of the animal wearing the hopple, while the swivels afford means for connecting the chain to the leg-bands $c$ in such manner as to allow the chain to turn freely at the ends and prevent strain thereon. The swivels $b$ form joints directly with plates B, which are connected to the leg-bands. I have heretofore used end links for connecting the swivels to the leg-bands, and plates for holding the links in position; but, apart from the greater expensiveness of such a construction, the end links are not adapted to allow sufficient freedom to the swivels. End links, furthermore, are specially objectionable, for the reason that, like a straight-link chain, they are likely to catch upon projecting objects. It will be seen that I dispense with the end links by forming swivel-joints with the plates B, whereby the hopple is not only made cheaper in construction, but is rendered free from the above-named objections.

The plate B, which is to be made of cast metal or any other suitable material, is formed with curved lateral extensions $d\ d'$, having hooks $e$ on the inner side, which are inclined toward each other, and are adapted to engage with the lapping ends of the leg-band $c$ by means of perforations therein. The extension $d'$ is provided with a slot, $f$, through which one end of the band is passed to hold it out of contact with the hook $e$, adjacent thereto, and allow the opposite end of the band to engage freely with the hook and be held thereby. The plate B is so constructed as to form a space, $g$, between its central portion and the leg-band to accommodate the head $h$ of the swivel in such manner that the head will not be closely confined, but shall be free to move and turn therein, while a loop, $i$, formed on the inner side of the plate, at its center, to inclose the lapping ends of the band, serves to close in the said space at the top and bottom and prevent the swivel-joint from becoming clogged with mud.

With the plate B constructed as above described, a buckle for the band $c$ is dispensed with, since the plate is adapted to serve the double purpose of connecting the chain to the band and of confining the band around an animal's leg. By means of a series of perforations in each end of the band the band is made adjustable from one position to another with respect to the plate, in order that when certain perforations are worn out by use the band may serve as well as ever by simply adjusting it so that the hooks of the plate will engage with other perforations. The plate may be simplified, however, by dispensing with the hooks and riveting the extensions $d\ d'$ to the band, as shown in Fig. 3. In this case a buckle will be provided for confining the band around the leg. If desired, as a means of still further lessening the cost of the plate, the loop $i$ may be omitted. As the main feature of my invention is a plate connected to the leg-band and forming a swivel-joint with the chain, it is obvious that the form of the plate may be variously modified without departing from the essential principle of my invention. For instance, the plate may be made of sufficient length to inclose more or less of the leg-band, and, when adapted to extend around the leg or nearly around it, may be constructed of spring-steel.

Having thus described my invention, what I claim, and desire to secure by Letters Patent, is—

1. The combination, with the chain and the leg-bands, of the plates forming swivel-joints with the chain, and having extensions provided with hooks on the inside, which incline toward each other, and a slot in one of the extensions for holding the end of the band, substantially as shown and described.

2. The combination, with the chain and leg-bands, of the plates constructed with a cavity or recess on the inside to accommodate the head of the swivel, and a loop for confining the band, which serves to inclose the said cavity to prevent the swivel from being clogged with mud, as shown and described, whereby open-end links for connecting the chain with the leg-bands shall be dispensed with, as set forth.

CHARLES J. GUSTAVESON.

Witnesses:
I. L. GRUNDHAND,
N. C. CHRISTENSEN,
JOHN MANNING.